US012686166B2

(12) United States Patent
Diener

(10) Patent No.: US 12,686,166 B2
(45) Date of Patent: Jul. 21, 2026

(54) PROCESS FOR PRODUCING A COMPONENT

(71) Applicant: Kyocera Fineceramics Europe GmbH, Mannheim (DE)

(72) Inventor: Sarah Diener, Selb (DE)

(73) Assignee: Kyocera Fineceramics Europe GmbH, Mannheim (DE)

( * ) Notice: Subject to any disclaimer, the term of this patent is extended or adjusted under 35 U.S.C. 154(b) by 78 days.

(21) Appl. No.: 18/602,580

(22) Filed: Mar. 12, 2024

(65) Prior Publication Data

US 2024/0308134 A1    Sep. 19, 2024

(51) Int. Cl.
| | |
|---|---|
| *B29C 64/165* | (2017.01) |
| *B28B 1/00* | (2006.01) |
| *B29C 64/35* | (2017.01) |
| *B33Y 10/00* | (2015.01) |
| *B33Y 30/00* | (2015.01) |
| *B33Y 40/20* | (2020.01) |
| *C09D 5/00* | (2006.01) |
| *C09D 7/61* | (2018.01) |
| *C09D 9/00* | (2006.01) |
| *C09D 139/06* | (2006.01) |
| *B29C 64/209* | (2017.01) |
| *B29C 64/214* | (2017.01) |

(52) U.S. Cl.
CPC ............ *B29C 64/165* (2017.08); *B28B 1/001* (2013.01); *B29C 64/35* (2017.08); *B33Y 10/00* (2014.12); *B33Y 30/00* (2014.12); *B33Y 40/20*

(2020.01); *C09D 5/008* (2013.01); *C09D 7/61* (2018.01); *C09D 9/005* (2013.01); *C09D 139/06* (2013.01); *B29C 64/209* (2017.08); *B29C 64/214* (2017.08)

(58) Field of Classification Search
CPC ......... B29C 64/165; B22F 10/14; B22F 10/16
USPC ......................................... 264/232
See application file for complete search history.

(56) References Cited

U.S. PATENT DOCUMENTS

| | | | |
|---|---|---|---|
| 6,596,224 B1 | 7/2003 | Sachs et al. | |
| 2004/0255841 A1 | 12/2004 | Enokido et al. | |
| 2015/0258705 A1* | 9/2015 | Hirata | ................... B29C 64/165 |
| | | | 428/210 |
| 2016/0339602 A1* | 11/2016 | Kato | ..................... B29C 64/393 |

FOREIGN PATENT DOCUMENTS

EP        4 066 969  A1    10/2022

OTHER PUBLICATIONS

Lakhdar et al., "Additive manufacturing of advanced ceramic materials", Progress in Materials Science, vol. 116, 2021, 50 pages.

* cited by examiner

*Primary Examiner* — Yung-Sheng M Tsui

(74) *Attorney, Agent, or Firm* — Dority & Manning, P.A.

(57) ABSTRACT

The present invention relates to a slip-based process for producing a component which provides the use of a washout agent for removing excess material, and a device for carrying out the process according to the invention.

13 Claims, 1 Drawing Sheet

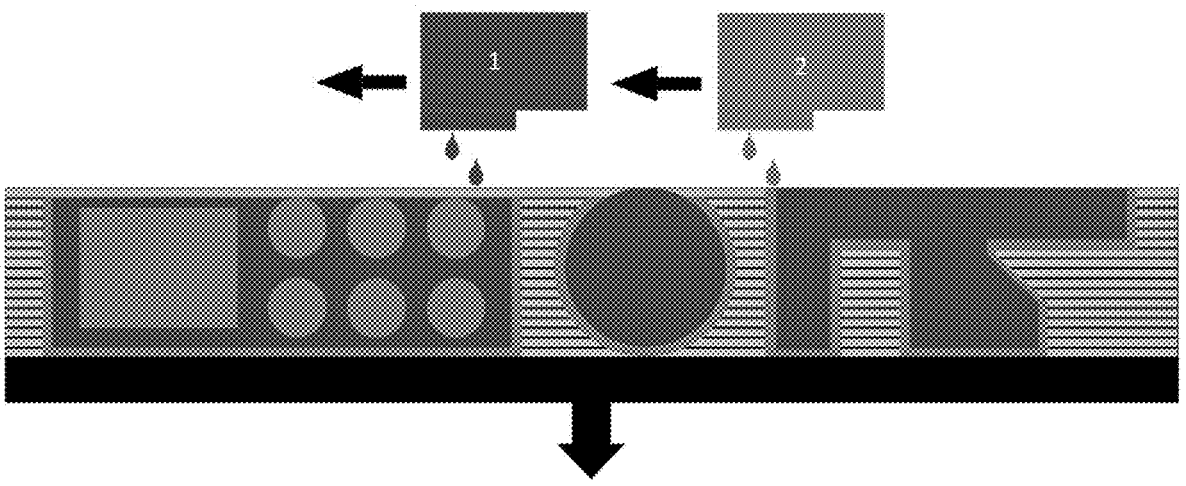

PROCESS FOR PRODUCING A COMPONENT

CROSS REFERENCE TO RELATED APPLICATIONS

This application claims priority to and the benefit of European Patent Application No. 23161980.0 filed in the European Patent Office on Mar. 15, 2023, the entire contents of which are incorporated herein by reference.

The present invention relates to a slip-based process for producing a component which provides the use of a washout agent for removing excess material, and a device for carrying out the process according to the invention.

3D printing is a collective term for all manufacturing processes in which the construction of the workpieces is effected layer by layer. The geometry of the workpiece is established at first on the basis of computer-generated data, and the material to be used for printing, such as a plastic material, synthetic resin, ceramic or metal, is applied in powder form layer by layer. One form of 3D printing is binder jetting, in which the powder is bonded in places that belong to the workpiece by selectively depositing a binder, and the next layer of material is applied. These steps are repeated until the workpiece is complete. Excess material remains loose in the respective layer at first, and thus forms a supporting powder bed, so that additional supporting structures can usually be omitted. When the construction of a workpiece is complete, the excess powder is removed and can be recycled into the process for further processing.

The so-called depowdering of the workpiece, in which the latter is freed from loose powder, is mostly a manual procedure, which can be any degree of complex, especially when the powder is fine or there are cavities in the workpiece. Accordingly, there is an interest in optimizing this process step.

DE 10 2018 119 027 describes a method for producing a component by way of stereolithography, comprising the following steps: A) producing a component in accordance with a virtual 3D model of the component by curing a liquid plastic material by way of stereolithography, and B) cleaning the component by rotating the component at least once about a rotational axis or about a plurality of rotational axes, thereby removing residues of the liquid plastic material from the surface of the component by way of a centrifugal force produced by the rotational movement. However, the process has the disadvantage that because of the low strength of non-sintered components and the high stability of the powder cake, it cannot be transferred to processes that work with liquid components and employ a compact powder bed, such as slip-based binder jetting. Also, cavities in the component are not covered by this method.

U.S. Pat. No. 5,490,882 discloses a process for removing loose powder particles from interior passages of a body made by a layer manufacturing technique comprising the steps of placing the body within a bath of liquid; and applying, to the liquid and the body, microwave energy of a frequency selected to heat the liquid throughout its volume so as to cause the liquid to boil throughout said volume, whereby fluid motion is produced within the interior passages of said body, by which loose powder is supposed to be removed from the interior passages.

In contrast to classical powder-based methods, the excess powder is not loose in slip-based methods, and there is occurrence of interactions between the powder particles and mechanical entanglement. Therefore, the remaining powder bed cannot be removed by means of pressurized air or other methods that are common with powder-based processes.

U.S. Pat. No. 6,596,224 relates to a method for creating a powder containing body, said method comprising the steps of: a. providing a support; b. over a selected area of said support, depositing a liquid slurry that contains a first powdered material in a continuous stream to form a first layer of powdered material; c. maintaining said deposited layer of powdered material under conditions such that the liquid content of said first layer is reduced; d. depositing a binder material at selected regions of said layer, which binder will cause said layer to become bound at said selected regions, and successive layers to become bound to each other at said selected regions; and e. over a portion of said selected area of said support, depositing liquid slurry to form an additional layer region. The slurry may contain a redispersing agent, by means of which non-bonded powder within the body is to be removed.

U.S. 2004/0255841 describes a method for producing photonic crystals, in which layers of a slurry of a dielectric powder are successively deposited onto a substrate by a jet printing technology to form a shaped article of dielectric layers. A predetermined region of the shaped article is bound with a binder to construct a photonic crystal having a three-dimensional structure. Excess powder can be removed by redispersing, by dipping the shaped article into water. Optionally, a dispersing agent may be added to the slurry in order to remove non-bonded powder.

Redispersing is based on the principle that water of a different liquid penetrates between the powder particles, which are distributed therein by and by. Redispersing is usually a slow process, and redispersing particles that are stuck in undercuts or passages is hardly possible, or only so with corresponding manual dressing.

Therefore, it has been the object of the present invention to provide a process that enables loose powder particles to be removed in components produced by means of slip-based 3D printing methods.

Surprisingly, it has been found that this object is achieved by a process in which a washout agent is selectively deposited.

Therefore, the present invention firstly relates to a process for producing a three-dimensional component by additive manufacturing, comprising the following steps, preferably in the stated order:

a) depositing a slip comprising powder particles to obtain a slip layer;

b) reducing the liquid content of the slip layer;

c) depositing a binder according to a cross-section of the component;

d) repeating steps a) to c) to obtain a powder bed with the component embedded therein;

e) contacting said powder bed with a liquid cleaning medium to obtain the desired component, characterized in that a washout agent is deposited at least partially onto the regions not wetted with the binder.

Especially by the separate printing of the washout agent, similarly as with the binder, a selective incorporation of the washout agent can be achieved without adversely affecting, for example, the viscosity of the slip, which is the case when the washout agent is contained in the slip. Therefore, an embodiment is preferred in which said washout agent is deposited separately from the slip.

The process according to the invention further offers the advantage that even locations within the component that are difficult to clean by the washout agent, such as interior passages, can be freed from excess powder material in a simple way.

In the process according to the invention, the liquid content of the deposited slip is reduced. This is usually done until a desired moisture content is reached, and may last until dryness is reached. The reduction of the moisture content of the slip is preferably effected by using an absorbent substrate, or aspirating the liquid components of the slip, for example, by applying a negative pressure. In this way, a highly compacted powder can be obtained, which may optionally be dried further by a supporting drying unit. Alternatively or in parallel, the reduction of the liquid content may be effected by means of heat, for example, by means of a heated platform, IR radiation, hot air, or other heat sources known to those skilled in the art.

The depositing of the washout agent may be effected in any of different ways. In a preferred embodiment, said washout agent is deposited after, or at the same time with, the depositing of the binder, wherein said depositing may be effected, for example, using different printing heads. In this manner, it is possible to produce a component in a time-efficient method, which component can be extracted from the powder bed efficiently by using the washout agent.

The washout agent is deposited at least partially onto those regions of the powder bed onto which no binder has been deposited. In a particularly preferred embodiment, the washout agent is deposited along the contours of the component and any interior structures that may be there, which allows for an economic and material-saving use of the washout agent and, in addition, for a clean extraction of the component from the powder bed. In a further preferred embodiment, said washout agent is deposited as a negative of the component's cross-section. Especially to free interior structures efficiently from non-bonded powder, it has proven advantageous to deposit the washout agent during the printing process. Therefore, an embodiment of the process according to the invention is preferred in which said washout agent is preferably deposited after depositing said binder. Therefore, in a particularly preferred embodiment, the process according to the invention comprises the following steps, preferably in the stated order:

a) depositing a slip comprising powder particles to obtain a slip layer;

b) reducing the liquid content of the slip layer;

c) depositing a binder according to a cross-section of the component;

d) depositing a washout agent at least partially onto the regions not wetted with the binder;

e) repeating steps a) to c) and optionally d) to obtain a powder bed with the component embedded therein;

f) contacting said powder bed with a liquid cleaning medium to obtain the desired component.

A first stability of the component is usually achieved by curing the binder. Therefore, an embodiment of the process according to the invention is preferred in which said process further comprises the curing of the binder. The curing of the binder is preferably performed during the printing process and can be effected, for example, thermally or by using a laser, depending on the type of binder. The curing of the binder is preferably effected before or after the depositing of the washout agent.

Another preferred embodiment of the process according to the invention further comprises a step in which said washout agent is dried. The drying of the washout agent is preferably effected before or after the curing of the binder, but before another slip layer is deposited.

Within the scope of the process according to the invention, excess powder is removed by contacting the powder bed with a liquid cleaning medium, and exporting the washout agent with the powder particles dispersed therein from the component. Therefore, in a preferred embodiment, said washout agent is selected from substances that are swellable in said liquid cleaning medium; substances that will develop gas upon contacting said liquid cleaning medium; from hydrophilization agents, and mixtures thereof. The thus produced increase in volume of the washout agent could achieve a particularly effective cleaning of the component from loose powder particles.

Preferably, said liquid cleaning medium is selected from the group consisting of water, alcohols, acetone, and mixtures thereof.

The washout agent provides that said component can be extracted from the powder bed, and excess powder particles may be removed. In a preferred embodiment, said washout agent is selected from the group consisting of starches, modified celluloses, casein, glycols, alginates, polysaccharides, dextrans, crosslinked polymers, especially crosslinked polyvinylpyrrolidone, sodium hydrogencarbonate, citric acid, tartaric acid, and sorbitan fatty acid esters.

The washout agent is preferably deposited by using a printing head, for example, a piezo printing head, which allows for a high precision and the resolution of delicate structures within the component. To ensure that the washout agent can be processed accordingly, it preferably has an approximately Newtonian or shear-thinning flow behavior with a viscosity of less than 35 mPas at high shear rates, for example at a shear rate of greater than 50 s-1, preferably greater than or equal to 100 s-1, the viscosity being determined at 25° C. using a rotational rheometer. According to the invention, the material from which the component is constructed is deposited in the form of a slip. Therefore, in a preferred embodiment, the process according to the invention further comprises one or more drying steps for drying the slip. Such drying can be effected in a way known to those skilled in the art.

Within the scope of the process according to the invention, a number of different materials may be used, ceramic materials being particularly preferred. Therefore, an embodiment is preferred in which the powder particles contained in the slip are selected from the group consisting of the oxides, carbides and nitrides of metals and nonmetals. Silicon carbide has found a broad range of applications because of its hardness and high temperature stability, but also represents a particular challenge in the processing. Surprisingly, it has been found that the process according to the invention is also suitable for the production of components based on ceramic material such as silicon carbide. Therefore, an embodiment is particularly preferred in which said powder particles are selected from the group consisting of silicon carbide, aluminum oxide, zirconium oxide, cordierite, silicon nitride, aluminum titanate, aluminum nitride or mixtures thereof. The particles preferably have a particle size of 0.1 to 200 μm, determinable by laser diffraction.

The binder employed in the process according to the invention preferably includes one or more compounds from the group consisting of resins, polysaccharides, polyvinyl alcohol, cellulose and cellulose derivatives, lignin sulfonates, polyethylene glycol, polyvinyl derivatives, polyacrylates, and mixtures thereof.

The present invention further relates to a device for performing the process according to the invention. The device according to the invention is characterized in that it includes a means for depositing a slip, a means for depositing a binder, and a means for depositing a washout agent. Preferably, the device according to the invention includes at least one means for depositing a slip, and at least one means for depositing a washout agent, in which said slip and washout agent can be deposited separately.

Preferably, the means for depositing the slip is a die, especially a slot die, or a doctor blade.

Further, an embodiment is preferred in which said means for depositing a binder and/or said means for depositing a washout agent is a die and/or a printing head.

The present invention is further explained by means of the following FIGURE, which should by no means be understood as limiting the idea of the invention.

FIG. 1 schematically shows the course of the process according to the invention, in which a binder is deposited in accordance with the desired geometry of the component by using a first printing head (1). The washout agent is deposited along the contours of the component by using a second printing head (2). After the printing process is complete, the component is extracted by contacting it with a cleaning agent that causes the washout agent to swell. The swelling of the washout agent achieves a "dislodging" of the loose powder particles, thus depowdering the component without a complicated reworking.

The invention claimed is:

1. A process for producing a three-dimensional component by additive manufacturing, comprising the steps of:
   a) depositing a slip comprising powder particles to obtain a slip layer;
   b) reducing the moisture content of the slip layer;
   c) depositing a binder on the powder layer according to a cross-section of the desired component;
   d) contacting said powder bed with a liquid cleaning medium to obtain the desired component
   e) repeating steps a) to c) to obtain a powder bed with the component embedded therein;
   characterized in that a washout agent is selectively deposited at least partially onto the regions not wetted with the binder.

2. The process according to claim 1, characterized in that said washout agent is deposited separately from the slip.

3. The process according to claim 1, characterized in that said washout agent is selected from the group consisting of substances that are swellable in said liquid cleaning medium; substances that will develop gas upon contacting said liquid cleaning medium; from hydrophilization agents, and mixtures thereof.

4. The process according to claim 1, characterized in that said liquid cleaning medium is selected from the group consisting of water, alcohols, acetone, and mixtures thereof.

5. The process according to claim 1, characterized in that said washout agent is selected from the group consisting of starches, modified celluloses, casein, glycols, alginates, polysaccharides, dextrans, crosslinked polymers, sodium hydrogencarbonate, citric acid, tartaric acid, and sorbitan fatty acid esters.

6. The process according to claim 1, characterized in that said process further includes one or more drying steps for drying the slip.

7. The process according to claim 1, characterized in that said slip contains powder particles selected from the group consisting of the oxides, carbides and nitrides of metals and non-metals.

8. The process according to claim 1, characterized in that said binder is selected from the group consisting of resins, polysaccharides, polyvinyl alcohol, cellulose and cellulose derivatives, lignin sulfonates, polyethylene glycol, polyvinyl derivatives, polyacrylates, and mixtures thereof.

9. A device for carrying out a process according to claim 1, characterized in that said device includes a slip depositing device, a binder depositing device, and a washout agent depositing device.

10. The device according to claim 9, characterized in that the slip depositing device is a die or a doctor blade.

11. The device according to claim 9, characterized in that said binder depositing device and/or said washout agent depositing device is a die and/or a printing head.

12. The process according to claim 5, wherein the crosslinked polymer comprises crosslinked polyvinylpyrrolidone.

13. The process according to claim 7, wherein the non-metals comprise silicon carbide particles.

* * * * *